[12] United States Patent
Ahmadi et al.

(10) Patent No.: US 9,926,700 B2
(45) Date of Patent: Mar. 27, 2018

(54) RUBBER PART FOR INCORPORATION INTO A BRICK OR MASONRY WALL IN A REINFORCED CONCRETE FRAME TO PROTECT AGAINST DAMAGE CAUSED BY SEISMIC ACTIVITY

(71) Applicant: Tun Abdul Razak Research Centre, Brickendonbury, Hertfordshire (GB)

(72) Inventors: Hamid Reza Ahmadi, New Barnet (GB); Alberto Dusi, Azzanello (IT)

(73) Assignee: Tun Abdul Razak Research Centre, Brickendonbury, Hertfordshire (GB)

( * ) Notice: Subject to any disclaimer, the term of this patent is extended or adjusted under 35 U.S.C. 154(b) by 0 days.

(21) Appl. No.: 14/917,195

(22) PCT Filed: Sep. 5, 2014

(86) PCT No.: PCT/GB2014/052702
§ 371 (c)(1),
(2) Date: Mar. 7, 2016

(87) PCT Pub. No.: WO2015/033161
PCT Pub. Date: Mar. 12, 2015

(65) Prior Publication Data
US 2016/0194867 A1    Jul. 7, 2016

(30) Foreign Application Priority Data

Sep. 5, 2013 (GB) .................................. 1315849.8
May 22, 2014 (GB) .................................. 1409155.7

(51) Int. Cl.
*E04B 1/98* (2006.01)
*E04B 2/02* (2006.01)
(Continued)

(52) U.S. Cl.
CPC .................. *E04B 1/98* (2013.01); *B32B 3/26* (2013.01); *B32B 13/042* (2013.01); *B32B 25/12* (2013.01);
(Continued)

(58) Field of Classification Search
CPC ... E04B 1/98; E04B 2/02; E04H 9/025; E04H 9/021; E04H 9/02; B32B 3/26;
(Continued)

(56) References Cited

U.S. PATENT DOCUMENTS 1,856,906 A * 5/1932 Carvel .................... B28B 7/241
  264/256
2,015,470 A * 9/1935 Gates ................ E04F 15/02016
  52/265
(Continued)

FOREIGN PATENT DOCUMENTS

CN   102268900 A   12/2011
DE   19716179 A1   10/1998
(Continued)

*Primary Examiner* — Jeanette E Chapman
(74) *Attorney, Agent, or Firm* — Rudy J. Ng; Bret E. Field; Bozicevic, Field & Francis LLP

(57) ABSTRACT

A rubber part for use as a structural component for incorporation into a brick or masonry wall structure in a reinforced concrete frame, to be located within the plane of the wall, has a length x and a stiffness along its length of $S_x$, a width y and a stiffness across its width of $S_y$, and a thickness z and a stiffness across its thickness of $S_z$, the stiffness of the part being anisotropic with $S_y > S_x$. The part is adapted such that, when in use, it is capable of controlling vibrations of the wall caused by seismic activity and also of having a damping effect thereby increasing the energy dissipation capacity of the structure. The rubber part is preferably in the form of a sheet and can be laminated on one or both major (Continued)

surfaces. The two major surfaces of the sheet may be contoured, for instance being corrugated across its width.

31 Claims, 6 Drawing Sheets

(51) Int. Cl.
  *E04H 9/02* (2006.01)
  *B32B 25/12* (2006.01)
  *B32B 25/14* (2006.01)
  *B32B 3/26* (2006.01)
  *B32B 13/04* (2006.01)

(52) U.S. Cl.
  CPC ............. *B32B 25/14* (2013.01); *E04B 2/02* (2013.01); *E04H 9/021* (2013.01); *E04H 9/025* (2013.01); *B32B 2272/00* (2013.01); *B32B 2307/56* (2013.01); *B32B 2607/00* (2013.01); *E04H 9/02* (2013.01)

(58) Field of Classification Search
  CPC ....... B32B 13/042; B32B 25/12; B32B 25/14; B32B 2607/00; B32B 2307/56; B32B 2272/00
  See application file for complete search history.

(56) References Cited

U.S. PATENT DOCUMENTS

| | | | | |
|---|---|---|---|---|
| 2,088,754 | A * | 8/1937 | Larson | E04B 1/644 52/412 |
| 3,328,930 | A * | 7/1967 | Knipper | E06B 1/24 49/504 |
| 3,916,968 | A * | 11/1975 | Masson | B60C 1/0016 152/454 |
| 4,035,975 | A * | 7/1977 | Gergely | E04B 2/18 52/284 |
| 4,216,856 | A | 8/1980 | Morning et al. | |
| 4,771,704 | A * | 9/1988 | Gronlund | B61F 5/122 105/193 |
| 5,102,107 | A * | 4/1992 | Simon | F16F 1/366 248/621 |
| 5,203,607 | A * | 4/1993 | Landi | B62J 1/26 297/214 |
| 5,290,356 | A * | 3/1994 | Frankowski | C04B 18/22 106/726 |
| 5,391,226 | A * | 2/1995 | Frankowski | C04B 18/22 106/696 |
| 5,861,205 | A * | 1/1999 | Murata | B01D 53/885 428/141 |
| 2004/0123530 | A1* | 7/2004 | Dorfmann | E04H 9/022 52/167.1 |
| 2007/0199273 | A1* | 8/2007 | Wang | E04B 2/08 52/604 |
| 2011/0061335 | A1* | 3/2011 | Scheckler | E04B 2/02 52/745.1 |

FOREIGN PATENT DOCUMENTS

| | | |
|---|---|---|
| EP | 0599145 A1 | 6/1994 |
| FR | 2912163 A1 | 8/2008 |
| JP | 2001254534 A | 9/2001 |
| RU | 123433 U1 * | 12/2012 |
| WO | WO9116195 A1 | 10/1991 |

* cited by examiner

RUBBER PART FOR INCORPORATION INTO A BRICK OR MASONRY WALL IN A REINFORCED CONCRETE FRAME TO PROTECT AGAINST DAMAGE CAUSED BY SEISMIC ACTIVITY

The present invention relates to a rubber part for use as a structural component for incorporation into a brick or masonry wall in a reinforced concrete (r.c.) frame to protect the wall and structure against damage by seismic activity.

Two popular traditional approaches to improving the seismic response of masonry infills in r.c. frame structures are either to prevent in-plane damaged infills from undergoing out-of-plane collapse during a seismic event or to avoid in-plane damage in order to prevent out-of-plane collapse. Allowing damage has a significant repair cost disadvantage since, after an earthquake, the damaged partitions and infills must be replaced. The latter approach involves suspending prefabricated panels to the frames in such a way that no in-plane deformations are applied to the panels during the seismic event. This requires sophisticated and expensive technology not widely applicable to low-income countries. Furthermore, it can result in poor durability of the joints between the prefabricated panels and, thus, can result in an increase in the seismic demand from the reinforced concrete structure.

In-plane damage to infills and partitions during an earthquake is the major cause of out-of-plane collapse. We have found that the problem of out-of-plane collapse can be solved, in a different and much more efficient way compared to the traditional approaches, by preventing in-plane damages using a rubber structural component. The component can also substantially improve the seismic performance of buildings (both new and existing) based on reinforced concrete moment-resisting structures.

The present invention provides a rubber part for use as a structural component for incorporation into a brick or masonry wall structure in a reinforced concrete frame, to be located within the plane of the wall, which part has a length x and a stiffness along its length of $S_x$, a width y and a stiffness across its width of $S_y$, and a thickness z and a stiffness across its thickness of $S_z$, the stiffness of the part being anisotropic with $S_y > S_x$, the said part being adapted such that, when in use, it is capable of controlling vibrations of the wall caused by seismic activity and also of having a damping effect thereby increasing the energy dissipation capacity of the structure. When the part is for location horizontally within the plane of the wall and on or in a horizontal row of bricks, the differential stiffness requirements of the part will preferably he such that $S_z > S_y > S_x$. Alternatively, when the part is for location vertically within the plane of the wall adjacent a vertical stack of bricks in the wall and the r.c. frame, it is preferred that $S_y > S_x$ and $S_y > S_z$.

The innovative approach proposed according to the present invention has the characteristics of very simple technology applicable not only to modern structures but also to traditional low-cost construction prevalent in low income seismic areas of the world. It relies on obtaining a combination of strength, deformability and energy dissipation capacity in three orthogonal directions from the rubber device. The use of the rubber part of the invention will, therefore, minimise the seismic damage to partitions and infill at a desired performance level, reduce seismic demand from reinforced concrete structures by providing auxiliary energy dissipative elements and, therefore, a reduction in the building's construction and life-cycle costs.

The rubber part structural component preferably has a substantially rectangular shape. It may be manufactured by extruding a rubber composition into the form of a long strip or by moulding, for instance compression or transfer moulding. The rubber may be a synthetic rubber or a natural rubber or a reclaimed or recycled rubber.

According to a preferred embodiment, the rubber part is in the form of a sheet. Preferably, the two major surfaces of the sheet are contoured. For instance, the transverse cross-section across the width of the part has a plurality of alternating elevated portions and lowered portions.

The rubber part, according to one preferred embodiment, is at least partially corrugated across its width, with the corrugations running along the length of the part. Typically, the corrugations will, in cross-section have the form of a wave, such as a curved wave, a square wave or a triangular wave.

The rubber part may be laminated on one or on both major sides, i.e. upper surface and lower surface, with an inextensible material. Examples of inextensible material include a rigid plate and inextensible fabric. The lamination enables the rubber part to achieve the required stiffness in the various directions.

Alternatively, or additionally, the rubber part may contain voids and/or inclusions to enable the part to achieve the required stiffness in the various directions. Inclusions may be compressible or incompressible materials.

In order that the invention can be fully understood and readily carried into effect, the same will now be described by way of example only, with reference to the accompanying drawings, of which:

FIGS. 2a to 2h show different embodiments of rubber part-containing housings as applied in the manner described in FIG. 1a.

Figure 3A:
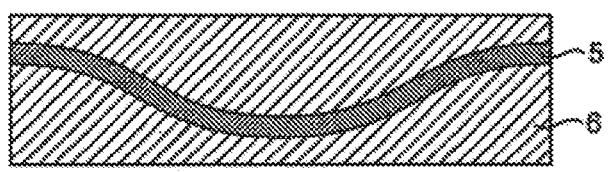
FIGS. 3a to 3e show different embodiments of the rubber part structural component in cross-section as applied in the manner described in FIG. 1b.
Figure 3B:
Figure 3C:
Figure 4A:
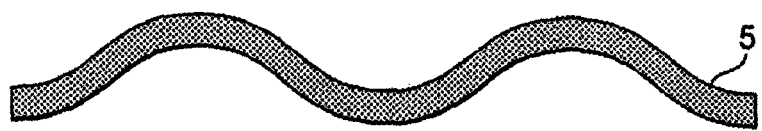
Figure 4B:
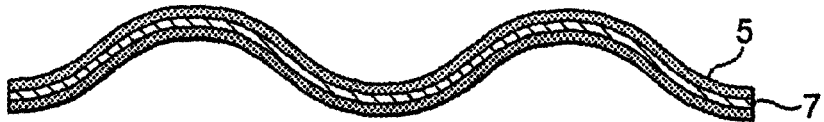
Figure 4C:
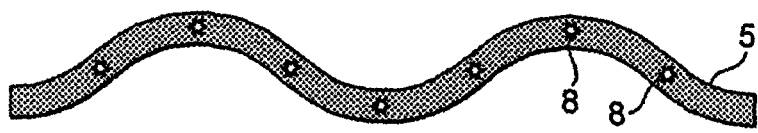
Figure 4D:
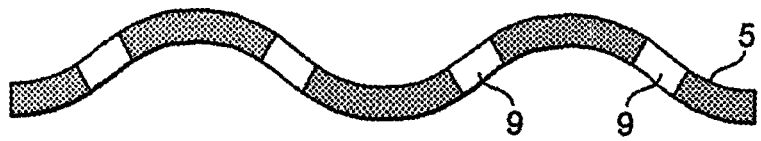
Figure 4E:
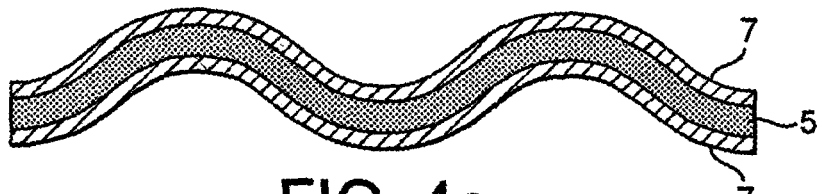

FIGS. 4a to 4e show different embodiments of the rubber part according to the cross-sections shown in FIGS. 3a-3c, wherein in FIG. 4a the rubber part is a homogenous rubber sheet, FIG. 4b shows a rubber sheet 5 containing a laminated sheet of inextensible material 7, FIG. 4c shows a rubber sheet 5 containing voids 8, FIG. 4d shows a rubber sheet 5 containing compressible or incompressible inclusions 9 and FIG. 4e shows a rubber sheet 5 contained within laminations of inextensible material.

Figure 1A:
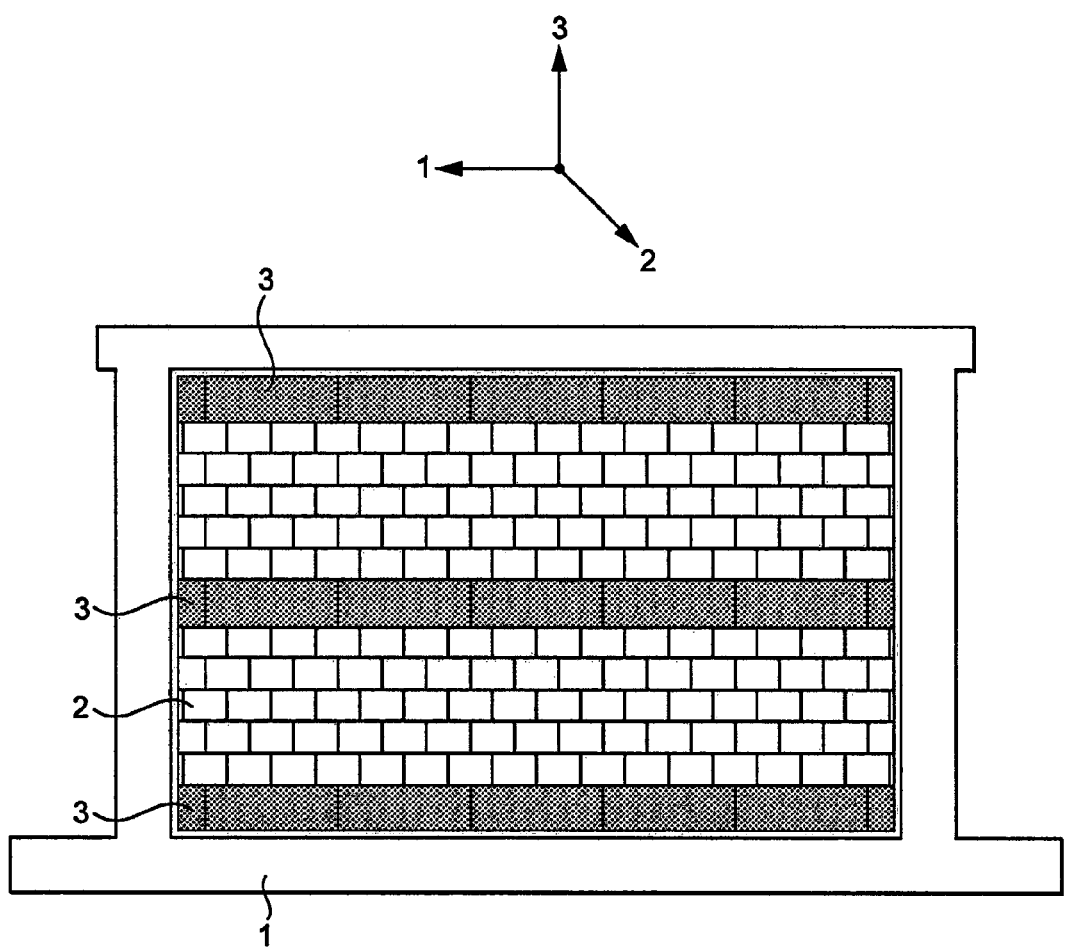
FIG. 1a is a diagrammatic view of a reinforced concrete frame with masonry infill where an embodiment of a rubber part structural component of the present invention is used in housings which replace three rows of masonry bricks in the infill.
Figure 2A:
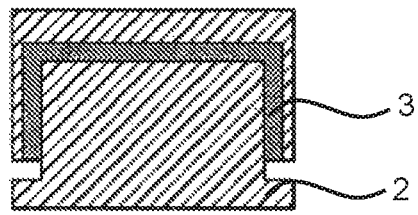
Figure 2B:
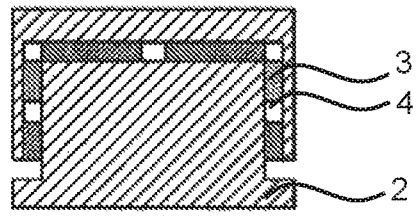
Figure 2C:
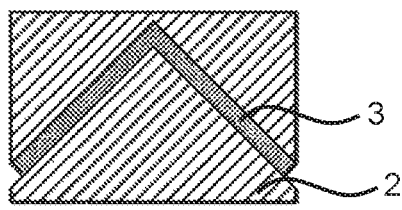
Figure 2D:
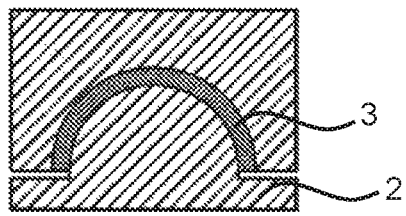
Figure 2E:
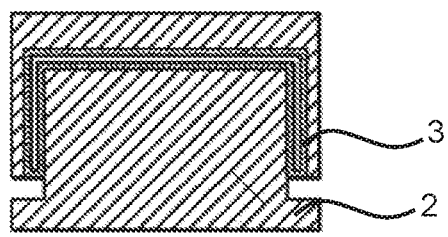
Figure 2F:
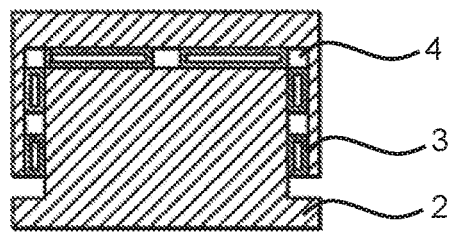
Figure 2G:
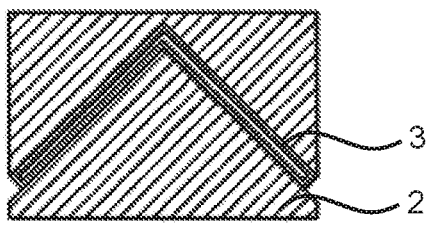
Figure 2H:
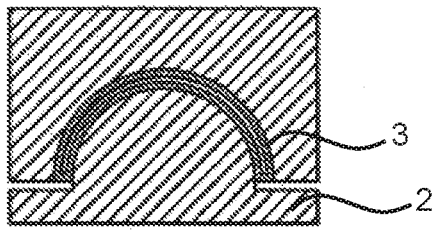

As shown in FIG. 1a, a reinforced concrete frame 1 is infilled with masonry bricks 2. Three rows of masonry bricks are replaced by composite rubber/masonry structural components 3 each of which comprises a rubber part of the invention as shown in FIG. 2a forming a housing over a brick. Alternative housings, utilizing the rubber part are shown diagrammatically in FIGS. 2b to 2h. The structural component illustrated in FIG. 2b contains inclusions 4. The component shown in FIG. 2c comprises a housing having a triangular cross-section and the component shown in FIG. 2d comprises a housing having an arched cross-section.

FIGS. 2e to 2h show alternative designs for the rubber housing having voids, inclusions and/or laminations.

Figure 1B:
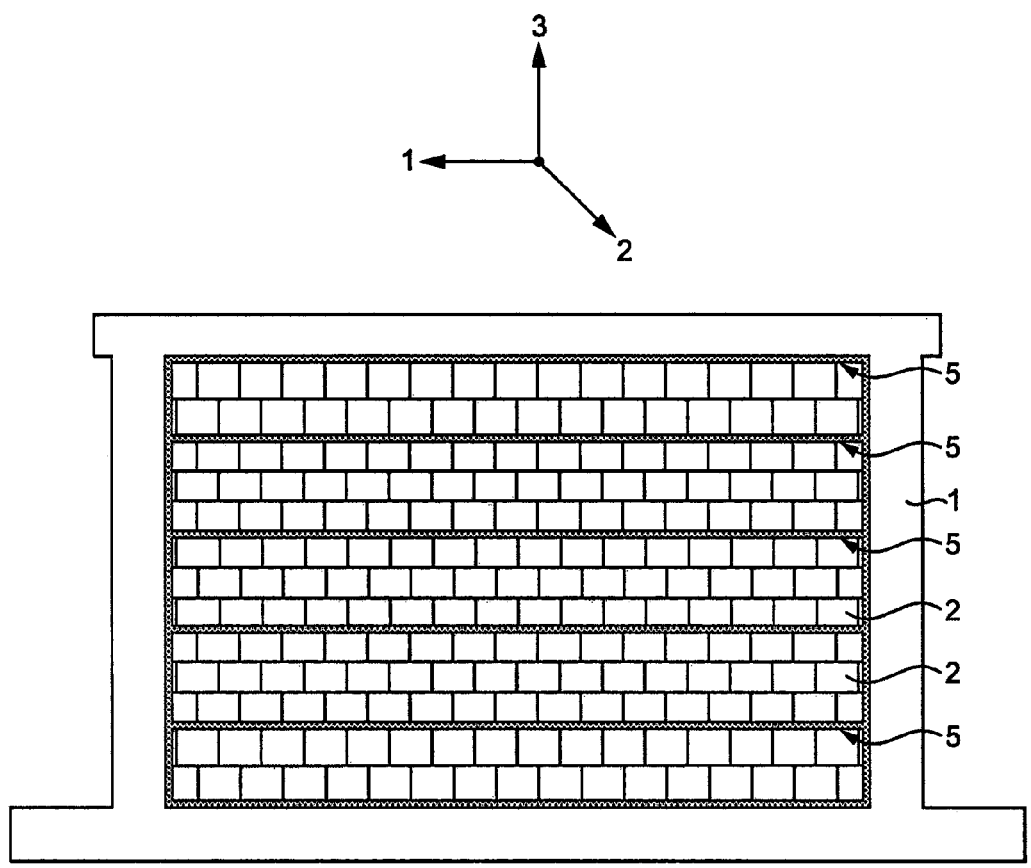
FIG. 1b is a diagrammatic view of a reinforced concrete frame with masonry infill where a rubber part of the invention is shown to have replaced rows of mortar between the masonry bricks in the infill and the wall and the r.c. frame.
Figure 3D:
Figure 3E:

FIG. 1b shows a reinforced concrete frame 1 which is infilled with masonry bricks 2. In this embodiment rubber parts 5, in the form of extruded strips, replaces mortar between some of the successive layers of masonry brick. The rubber parts 5 may have corrugations running lengthwise as shown in FIGS. 3a to 3e. FIGS. 3a to 3c show different embodiments of corrugations which, in cross-section, show curved wave forms. FIG. 3d shows a corrugation in the form of a square wave (in cross-section) and FIG. 3e shows a corrugation in the form of a triangular wave or zigzag (in cross-section). The rubber part may simply be placed between two successive layers of bricks in the frame with mortar, or other mouldable but hardenable composition, filling up the gap between the rubber part and the surfaces of the bricks. FIG. 3a shows an embodiment where the rubber part 5 is embedded in a mortar 6. The mortar, or other mouldable but hardenable composition, should have sufficient strength to sustain the stresses required to transmit any force arising from a seismic event between the bricks and the rubber part. Alternatively, the rubber part may be sandwiched or bonded either between rigid plates or inextensible fabric (for example an inextensble woven fabric). Mortar, or other mouldable but hardenable composition, may then be used to fill the voids between the rubber part and the brick surfaces as well as adhering the part to the surfaces of the bricks. Rough surfaces of rigid plates or woven fabric will provide a good key-in mechanisms and, hence, a stronger bond.

The rubber layer may be homogeneous as shown in FIG. 4a for the section shown in FIG. 3b or laminated with inextensible materials 7 to achieve the required stiffness of the components in various directions as shown in FIGS. 4b and 4e for the section shown in FIG. 3b. Alternatively, the rubber layer may have voids 8 as shown in FIG. 4c for the section shown in FIG. 3b or with compressible or incompressible inclusions 9 as shown in FIG. 4d for the section shown in FIG. 3b. The rubber may be synthetic or natural from fresh material or reclaimed or recycled having low or high levels of damping.

Preferably, in order to optimise damping, the rubber will be a high damping rubber.

The rubber part may be used as a structural component in the construction of a wall in order to prevent damage caused by a seismic event.

The concept underlying the invention relies on obtaining a combination of strength, deformability and energy dissipation capacity in three orthogonal directions from the rubber part. It may therefore be possible to design reinforced concrete frames, partitions and infills in such a way that their combined behaviour is optimised in terms of:
  minimising the seismic damage to the partitions and infill at a desired performance level;
  reducing the seismic demand from the reinforced concrete by providing auxiliary energy dissipative elements;
  improving the seismic performance of existing reinforced concrete frames, before or after a seismic event;
  minimising the building's cost of the construction and its life-cycle cost.

The material used for the rubber part of the invention may be fresh or recycled synthetic or natural rubber and may be either low damping rubber or high damping rubber. High damping rubbers would be suitable to high seismicity areas where the ductility demand from structures is high. Enhancing damping of the building using auxiliary damping devices would reduce the demand from the structure. This would provide reduction in the cost of new structures and offer a simple retrofitting approach for upgrading buildings considered vulnerable.

The invention claimed is:

1. The use of a rubber part in the construction of a brick or masonry wall within a reinforced concrete frame structure for eliminating the in-plane damage to the wall while controlling its out-of-plane collapse during a seismic event, the said part having anisotropic stiffness in the three orthogonal directions of the wall as well as damping properties thereby increasing the energy dissipation capacity of the structure, which use comprises locating the rubber part within the plane of the wall and on or in a horizontal row of bricks, wherein the rubber part has a length x and a stiffness along its length of Sx, a width y and a stiffness across its width of Sy and a thickness z and a stiffness across its thickness of Sz, the stiffness of the part being anisotropic with Sz>Sy>Sx and wherein the rubber part is in the form of a sheet, and
  wherein any gaps between the external surface of the rubber part and the internal surfaces of the bricks are filled with a hardenable composition.

2. The use according to claim 1, wherein the rubber part has a substantially rectangular shape.

3. The use according to claim 1, wherein the rubber part has a transverse cross-section across the width of the part which has a plurality of alternating elevated portions and lowered portions.

4. The use according to claim 3, wherein the part has corrugations running along its length.

5. The use according to claim 4, wherein the cross-section of the corrugations has the form of a wave selected from a curved wave, a square wave and a triangular wave.

6. The use according to claim 1, wherein the rubber of the rubber part is a synthetic rubber, a natural rubber, a reclaimed rubber or a recycled rubber.

7. The use according to claim 1, wherein the rubber part is an extruded strip.

8. The use according to claim 1, wherein the rubber part is a moulded part.

9. The use according to claim 1, wherein the rubber part is laminated with an inextensible material.

10. The use according to claim 9, wherein the rubber part is laminated on both sides.

11. The use according to claim 9, wherein the inextensible material is a rigid plate or an inextensible fabric.

12. The use according to claim 1, wherein the rubber of the rubber part contains voids or inclusions.

13. The use according to claim 12, wherein the inclusions are compressible inclusions or incompressible inclusions.

14. The use according to claim 1, wherein the rubber part is formed into a housing to at least partially cover a brick in the brick wall.

15. The use according to claim 1, wherein the rubber of the rubber part is a high damping rubber.

16. The use according to claim 1, wherein the rubber part is located between two successive horizontal rows of bricks in the brick wall.

17. The use of a rubber part in the construction of a brick or masonry wall within a reinforced concrete frame structure for eliminating the in-plane damage to the wall while controlling its out-of-plane collapse during a seismic event, the said part having anisotropic stiffness and damping properties thereby increasing the energy dissipation capacity of the structure, which use comprises locating the rubber part vertically within the plane of the wall adjacent a vertical stack of bricks in the wall and in the reinforced concrete frame, wherein the rubber part has a length x and a stiffness along its length of Sx, a width y and a stiffness across its width of Sy and a thickness z and a stiffness across its thickness of Sz, the stiffness of the part being anisotropic such that Sy>Sx and Sy>Sz, and wherein the rubber part is in the form of a sheet, and wherein any gaps between the external surface of the rubber part and the internal surfaces of the bricks are filled with a hardenable composition.

18. The use according to claim 17, wherein the rubber part has a substantially rectangular shape.

19. The use according to claim 17, wherein the rubber part has a transverse cross-section across the width of the part which has a plurality of alternating elevated portions and lowered portions.

20. The use according to claim 19, wherein the part has corrugations running along its length.

21. The use according to claim 20, wherein the cross-section of the corrugations has the form of a wave selected from a curved wave, a square wave and a triangular wave.

22. The use according to claim 17, wherein the rubber of the rubber part is a synthetic rubber, a natural rubber, a reclaimed rubber or a recycled rubber.

23. The use according to claim 17, wherein the rubber part is an extruded strip.

24. The use according to claim 17, wherein the rubber part is a moulded part.

25. The use according to claim 17, wherein the rubber part is laminated with an inextensible material.

26. The use according to claim 25, wherein the rubber part is laminated on both sides.

27. The use according to claim 25, wherein the inextensible material is a rigid plate or an inextensible fabric.

28. The use according to claim 17, wherein the rubber of the rubber part contains voids or inclusions.

29. The use according to claim 28, wherein the inclusions are compressible inclusions or incompressible inclusions.

30. The use according to claim 17, wherein the rubber part is formed into a housing to at least partially cover a brick in the brick wall.

31. The use according to claim 17, wherein the rubber of the rubber part is a high damping rubber.

* * * * *